(12) United States Patent
Mihara et al.

(10) Patent No.: US 10,143,042 B2
(45) Date of Patent: Nov. 27, 2018

(54) HEATING DEVICE

(71) Applicant: NICHIAS CORPORATION, Tokyo (JP)

(72) Inventors: Tetsuya Mihara, Tokyo (JP); Ken Yonaiyama, Tokyo (JP); Tomohiko Kishiki, Tokyo (JP); Yuta Isaka, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 949 days.

(21) Appl. No.: 14/402,543

(22) PCT Filed: Nov. 15, 2012

(86) PCT No.: PCT/JP2012/007321
§ 371 (c)(1),
(2) Date: Nov. 20, 2014

(87) PCT Pub. No.: WO2013/175545
PCT Pub. Date: Nov. 28, 2013

(65) Prior Publication Data
US 2015/0163861 A1    Jun. 11, 2015

(30) Foreign Application Priority Data
May 22, 2012 (JP) .................. 2012-116356

(51) Int. Cl.
*H05B 3/06* (2006.01)
*H05B 3/26* (2006.01)
(Continued)

(52) U.S. Cl.
CPC .............. *H05B 3/06* (2013.01); *C03C 13/00* (2013.01); *C03C 25/002* (2013.01); *C03C 25/42* (2013.01);
(Continued)

(58) Field of Classification Search
CPC ..... H05B 3/06; H05B 3/08; H05B 3/26–3/32; H05B 3/36–3/38
(Continued)

(56) References Cited

U.S. PATENT DOCUMENTS 2,880,298 A * 3/1959 Yohe ................. H05B 3/76
219/542
2,887,557 A * 5/1959 Rath ................ C08K 3/0016
174/77 R
(Continued)

FOREIGN PATENT DOCUMENTS

JP    07-272839 A    10/1995
JP    2000-077167 A    3/2000
(Continued)

OTHER PUBLICATIONS

Extended European Search Report issued in corresponding application 12877413.0, completed on Dec. 17, 2015 and dated Jan. 11, 2016.
(Continued)

*Primary Examiner* — Michael Laflame, Jr.
(74) *Attorney, Agent, or Firm* — Griffin and Szipl PC

(57) ABSTRACT

A heating device 10 including a heat-generating member 20 and a support member 30 that supports the heat-generating member 20 and comprises bio-soluble inorganic fibers, wherein the bio-soluble inorganic fibers do not contact directly the heat-generating member 20 or contact of the bio-soluble inorganic fibers with the heat-generating member 20 is reduced.

10 Claims, 2 Drawing Sheets

(51) Int. Cl.
*H05B 3/36* (2006.01)
*C04B 35/622* (2006.01)
*C03C 13/00* (2006.01)
*C03C 25/002* (2018.01)
*C03C 25/42* (2006.01)
*C04B 35/628* (2006.01)
*C04B 35/632* (2006.01)

(52) U.S. Cl.
CPC .... *C04B 35/6224* (2013.01); *C04B 35/62849* (2013.01); *C04B 35/632* (2013.01); *H05B 3/265* (2013.01); *C03C 2213/02* (2013.01); *C04B 2235/3206* (2013.01); *C04B 2235/3208* (2013.01); *C04B 2235/72* (2013.01); *C04B 2235/77* (2013.01); *C04B 2235/96* (2013.01); *C04B 2235/9669* (2013.01); *H05B 2203/012* (2013.01)

(58) Field of Classification Search
USPC ............... 219/285, 520, 542, 544, 546, 548
See application file for complete search history.

(56) References Cited

U.S. PATENT DOCUMENTS

| | | | | |
|---|---|---|---|---|
| 3,959,001 | A | * | 5/1976 | Clasen .................... C04B 35/04 501/112 |
| 4,087,777 | A | * | 5/1978 | Clasen .................... C04B 35/04 174/102 P |
| 6,551,951 | B1 | * | 4/2003 | Fay ........................ B32B 27/12 169/48 |
| 2004/0254056 | A1 | | 12/2004 | Jubb et al. |
| 2005/0233887 | A1 | | 10/2005 | Jubb et al. |
| 2009/0127489 | A1 | | 5/2009 | Jubb et al. |
| 2009/0208385 | A1 | | 8/2009 | Howarth et al. |
| 2011/0311404 | A1 | * | 12/2011 | Creedon ............. C23C 18/1216 422/177 |
| 2012/0100983 | A1 | | 4/2012 | Yonaiyama et al. |
| 2012/0252295 | A1 | | 10/2012 | Ishihara et al. |

FOREIGN PATENT DOCUMENTS

| | | |
|---|---|---|
| JP | 2001-273973 A | 10/2001 |
| JP | 2005-514318 A | 5/2005 |
| JP | 2006-086054 A | 3/2006 |
| JP | 2008-162852 A | 7/2008 |
| JP | 2008-523267 A | 7/2008 |
| JP | 2010-260907 A | 11/2010 |
| JP | 2010-277917 A | 12/2010 |
| JP | 2011-181258 A | 9/2011 |
| JP | 2011-228018 A | 11/2011 |
| JP | 4902797 B1 | 1/2012 |
| WO | 2012/049858 A | 4/2012 |

OTHER PUBLICATIONS

Explanation of situation for accelerated examination issued in corresponding Japanese application 2012-116356 dated Jul. 9, 2012.
International Search Report issued in corresponding application PCT/JP2012/007321, completed Nov. 29, 2012 and dated Dec. 11, 2012.
Office Action issued in corresponding Japanese application 2012-116356 dated Jul. 24, 2012.
Office Action issued in corresponding Japanese application 2013-078635 on Jul. 24, 2015 (no translation available; submitted for certification).

* cited by examiner

HEATING DEVICE

This is a National Phase Application in the United States of International Patent Application No. PCT/JP2012/007321 filed Nov. 15, 2012, which claims priority on Japanese Patent Application No. 2012-116356, filed May 22, 2012. The entire disclosures of the above patent applications are hereby incorporated by reference.

TECHNICAL FIELD

The invention relates to a heating device that has a heat-generating member such as an electric heater, and a heat-insulating support member.

BACKGROUND ART

Conventionally, as an electric heater structure (heating device) having a configuration in which a helically-wound, coiled electric wire (heating coil) is supported by an insulating material, one in which a kneaded product prepared by adding an inorganic binder to ceramic fibers or the like and by adjusting them is formed in a plate-like shape to allow it to serve as a support member and a heating coil is attached thereto is known, for example (Patent Document 1, for example).

On the other hand, recently, a problem caused by inhalation of inorganic fibers by a human body and invasion of the inhaled fibers to the lung has been pointed out. Under such circumstances, bio-soluble inorganic fibers that do not or hardly cause problems even when inhaled by a human body have been developed (Patent Document 2, for example).

RELATED ART DOCUMENTS

Patent Documents

Patent Document 1: JP-A-2001-273973
Patent Document 2: JP-T-2005-514318

SUMMARY OF THE INVENTION

An object of the invention is to provide a heating device provided with a support member that comprises bio-soluble inorganic fibers, in which a reaction between the fibers and a heat-generating member at high temperatures is suppressed.

The inventors have found that, when bio-soluble fibers are used in a heat-insulating member that supports an electric coil, fibers that contact the electric coil that is heated at high temperatures are molten. By preventing such a contact, specifically, by placing as an inclusion a component that hardly reacts with both of bio-soluble fibers and a heat-generating member at a position where the fibers and the heat-generating member contact, melting is suppressed. The invention has been made based on this finding.

According to the invention, the following heating device is provided.
1. A heating device comprising a heat-generating member and a support member that supports the heat-generating member and comprises bio-soluble inorganic fibers, wherein the bio-soluble inorganic fibers do not contact directly the heat-generating member or contact of the bio-soluble inorganic fibers with the heat-generating member is reduced.
2. The heating device according to 1, wherein the bio-soluble inorganic fibers have the following composition:
   $SiO_2$: 50 to 82 wt %
   Total of CaO and MgO: 10 to 43 wt %.
3. The heating device according to 1 or 2, wherein the bio-soluble inorganic fibers have the following composition:
   Total of $SiO_2$, $ZrO_2$, $Al_2O_3$ and $TiO_2$: 50 to 82 wt %
   Total of an alkali metal oxide and an alkaline earth metal oxide: 18 to 50 wt %.
4. The heating device according to any of 1 to 3, wherein the bio-soluble inorganic fibers are Mg silicate fibers having the following composition or Ca silicate fibers having the following composition:
   [Mg silicate fibers]
   $SiO_2$: 66 to 82 wt %
   CaO: 1 to 9 wt %
   MgO: 10 to 30 wt %
   $Al_2O_3$: 0 to 3 wt %
   Other oxides: 0 wt % or more and less than 2 wt %
   [Ca silicate fibers]
   $SiO_2$: 66 to 82 wt %
   CaO: 10 to 34 wt %
   MgO: 0 to 3 wt %
   $Al_2O_3$: 0 to 5 wt %
   Other oxides: 0 wt % or more and less than 2 wt %.
5. The heating device according to any of 1 to 4, wherein the bio-soluble inorganic fibers do not contact directly the heat-generating member or the contact of the bio-soluble inorganic fibers with the heat-generating member is reduced due to any of the following configurations (1) to (3):
   (1) at least surfaces of the support member that contact the heat-generating member are coated;
   (2) bio-soluble inorganic fibers that are present on at least surfaces of the support member that contact the heat-generating member are coated; and
   (3) the heat-generating member is coated.
6. The heating device according to 5, wherein in the configuration (1), a silica-containing treatment agent is infiltrated into the support member through at least the surfaces that contact the heat-generating member to cause the surfaces to be hardened.
7. The heating device according to 5 or 6, wherein in the configuration (2), the bio-soluble inorganic fibers are coated with a silica-containing treatment agent.
8. The heating device according to any of 5 to 7, wherein in the configuration (3), the heat-generating member is coated with the same component as that of a silica-containing treatment agent.
9. The heating device according to any of 6 to 8, wherein the silica is in one form or in a combination of two or more forms selected from colloid, powder and a metal alkoxide.
10. The heating device according to any of 6 to 9, wherein the silica-containing treatment agent comprises a chelating agent that does not contain metal ions.
11. The heating device according to any of 6 to 9, wherein the silica-containing treatment agent contains an acid.
12. The heating device according to any of 6 to 11, wherein the silica is an acidic colloidal silica or a cationic colloidal silica.
13. The heating device according to any of 1 to 12, wherein the reaction between the bio-soluble inorganic fibers and the heat-generating member is suppressed when the temperature of the heat-generating member is 1100° C.
14. The heating device according to any of 1 to 13, wherein the bio-soluble inorganic fibers are heat-treated.

According to the invention, it is possible to provide a heating device provided with a support member that comprises bio-soluble inorganic fibers, in which a reaction between fibers and a heat-generating member at high temperatures is suppressed.

MODE FOR CARRYING OUT THE INVENTION

Figure 1A:
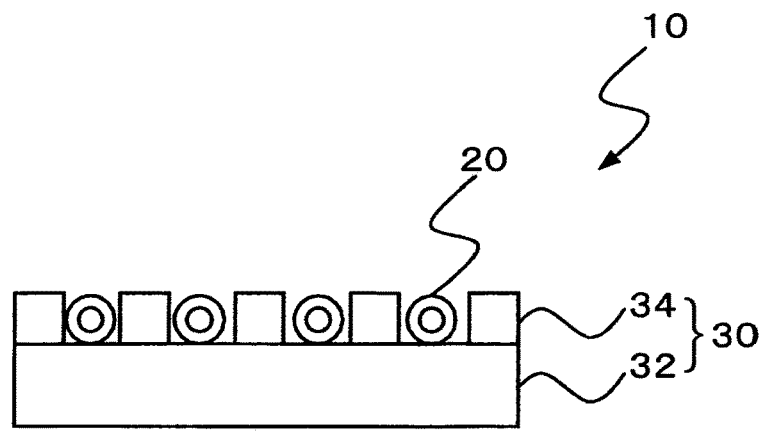
FIG. 1A is a schematic cross-sectional view of a heating device according to one embodiment of the invention.

The heating device of the invention comprises a heat-generating member and a support member that supports the heat-generating member, and the support member is formed of a heat-insulating member that comprises bio-soluble inorganic fibers. The heating device of the invention is configured such that a part where bio-soluble inorganic fibers contact a heat-generating member is reduced, preferably configured such that bio-soluble inorganic fibers do not directly contact a heat-generating member.

For example, at least surfaces of the support member that contact a heat-generating member are coated by a silica-containing treatment agent.

For example, a silica-containing treatment agent is infiltrated into a support member through the surface thereof (together with a fluid, for example), and the surface of the support member (bio-soluble inorganic fibers) is coated with silica. By this treatment, the surface is hardened, and dropping of powder from the surface, or other problems can be prevented. As for the coating of the support member (bio-soluble inorganic fibers), only a part of the support member (bio-soluble inorganic fibers) that contacts a heat-generating member may be coated, or the entire surface of the support member may be coated.

As the method for coating the surface of the support member with a silica-containing treatment agent, in addition to the above-mentioned hardening method, coating with a silica-containing treatment agent can be given. In the hardening treatment, a silica-containing treatment agent is infiltrated into a large part of the support member. In coating, a large part of the silica-containing treatment agent is present on the support member in the form of a film. A coating liquid to be applied to the support member may include, in addition to silica, an inorganic binder, an organic thickener, a solvent or the like, in order to adjust viscosity. The amounts of these may be appropriately adjusted.

The silica-containing treatment agent may contain, in addition to silica, a component that does not react bio-soluble fibers or a heat-generating member at high temperatures. Silica may be in the form of colloid, inorganic powder, a metal alkoxide or the like. One or more forms of silica may be used in combination.

Silica or an alkaline earth metal contained in bio-soluble fibers may react with alumina contained in an external member. Therefore, it is preferred that a smaller amount of alumina be contained and a larger amount of silica be contained in a silica-containing treatment agent. The content of silica is preferably 20 wt % or more, further preferably 40 wt % or more, more preferably 60 wt % or more, further more preferably 80 wt % or more, with 90 wt % or more being desirable. The silica-containing treatment agent comprises only silica with impurities being inevitably mixed in.

Instead of coating the surface of the support member, a heat-generating member may be coated. Both the surface of the support member and the heat-generating member may be coated. When coating a heat-generating member, a heat-generating member is coated with a ceramic tube, quartz tube or the like. It is possible to fill a space between a heat-generating member and the coating with an insulating material.

The heat-generating member may be coated with the same component as that of the silica-containing treatment agent that is used for coating the support member or the fibers. In this case, it is preferred that the amount of alumina be small and the amount of silica be large.

If a heating device has a configuration in which bio-soluble inorganic fibers constituting the support member are in contact with the heat-generating member, when the temperature arises, the bio-soluble inorganic fibers start to react with the heat-generating member. It assumes to be caused by the composition of the bio-soluble inorganic fibers (in particular, an alkali metal and/or an alkaline earth metal) and the composition of the heat-generating member (in particular, an oxide coating film formed on the outer periphery of the heat-generating member). However, as mentioned above, according to the invention, the heating device has a configuration in which the contact of the bio-soluble inorganic fibers and the heat-generating member is reduced. As a result, such a reaction can be suppressed, or preferably no reaction occurs.

In the heating device of the invention, the reaction between the bio-soluble fibers and the heat-generating member is suppressed when the temperature of the heat-generating member is preferably 400° C. or higher, more preferably 800° C. or higher, further preferably 1000° C. or higher, and particularly preferably 1100° C. or higher.

Figure 1B:
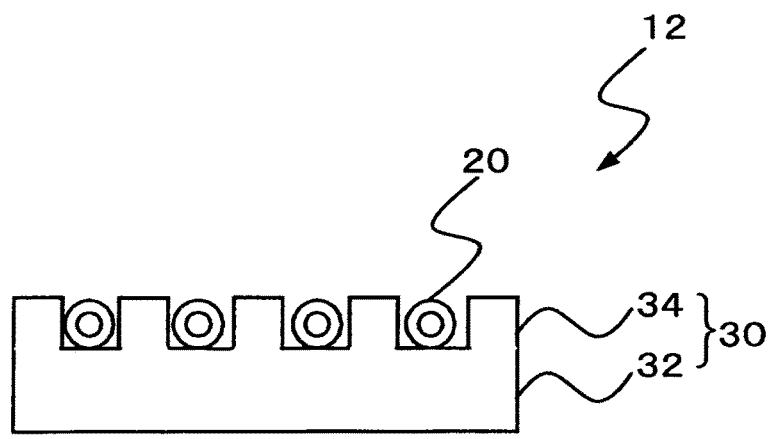
FIG. 1B is a schematic cross-sectional view of a heating device according to another embodiment of the invention.
Figure 1C:
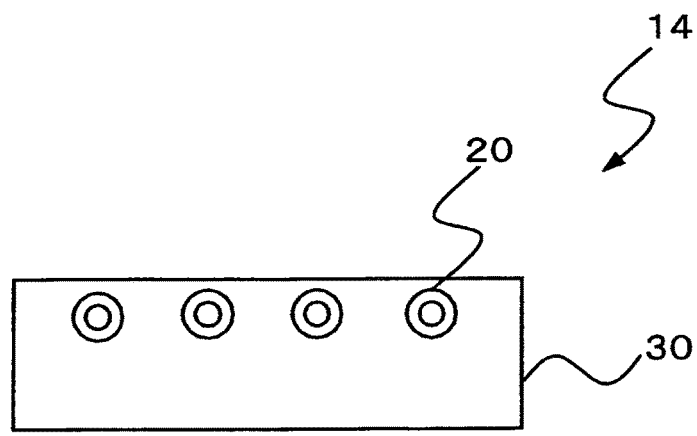
FIG. 1C is a schematic cross-sectional view of a heating device according to another embodiment of the invention.

FIGS. 1A to 1C each show the outline of the configuration of the heating device of the invention. In FIG. 1A, a heating device 10 is formed of a heat-generating member 20 and a support member 30. The support member 30 is formed of a base part 32 and a side wall 34. The base part and the side wall are laminated. On the base part 32, the heat-generating member 20 is arranged between the side walls 34.

A heating device 12 shown in FIG. 1B is the same as the heating device 10 shown in FIG. 1A, except that the base part 32 and the side wall 34 are integrally formed.

In a heating device 14 shown in FIG. 1C, the heat-generating member 20 is embedded in the support member 30.

Any of the heating devices 10, 12 and 14 shown in FIGS. 1A to 1C has a configuration in which the bio-soluble inorganic fibers do not contact the heat-generating member (not shown).

Figure 2:
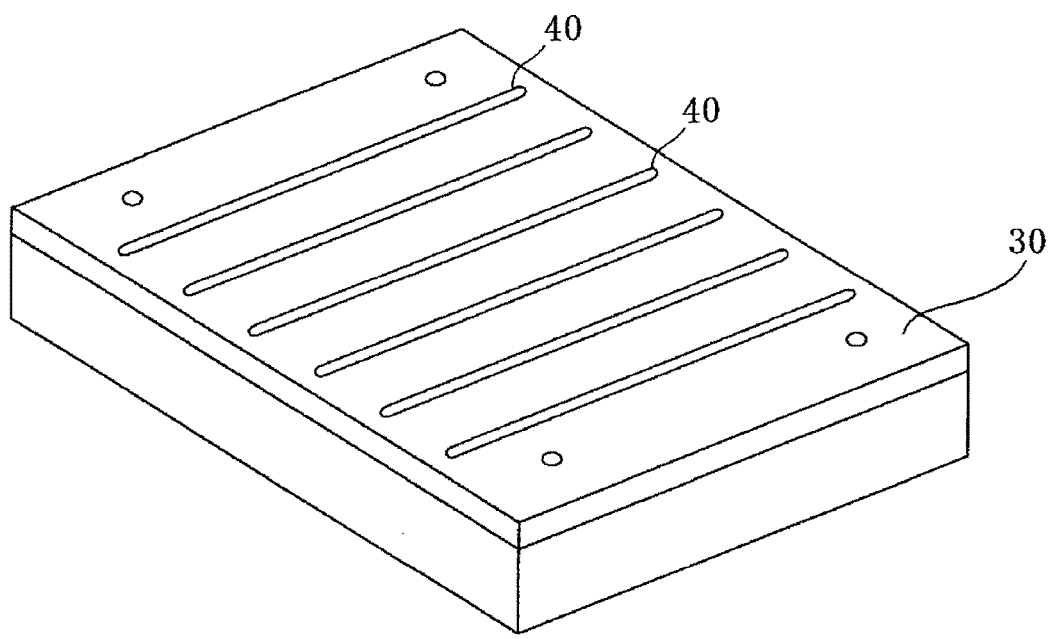
FIG. 2 is a perspective view of a heating device according to another embodiment of the invention.

FIG. 2 shows a side view of a typical heating device. A plurality of grooves 40 that extend linearly are formed in parallel at a predetermined interval. A support member 30 is formed of a base part and a side wall, both of which form the grooves 40. In the groove, a heat-generating member (not shown) is arranged.

As another example of the heating device, a device disclosed in JP-A-2011-181258 can be given. For example, a device that blocks the groove shown in FIG. 5, a cylindrical or semi-cylindrical device shown in FIGS. 6 and 7 of this publication, or the like can be given.

The support member used in the heating device of the invention comprises inorganic fibers. For example, the support member used in the heating device of the invention comprises 20 to 99 wt % (preferably 30 to 95 wt %, further preferably 50 to 95 wt %) of inorganic fibers. It is preferred that the inorganic fibers be composed of $SiO_2$, CaO and MgO as the main components. The main component means that the total of these components is 90 wt % or more or 95 wt % or more.

The inorganic fibers may be bio-soluble fibers having the following composition.

Total of $SiO_2$, $ZrO_2$, $Al_2O_3$ and $TiO_2$: 50 wt % to 82 wt %.

Total of an alkali metal oxide and an alkaline earth metal oxide: 18 wt % to 50 wt %.

The inorganic fibers may be bio-soluble fibers having the following composition.

$SiO_2$: 50 to 82 wt %

Total of CaO and MgO: 10 to 43 wt %

Bio-soluble fibers can be roughly divided into Mg silicate fibers containing a large amount of MgO and Ca silicate fibers containing a large amount of CaO. As the Mg silicate fibers, the following composition can be exemplified.

$SiO_2$: 66 to 82 wt %

CaO: 1 to 9 wt %

MgO: 10 to 30 wt %

$Al_2O_3$: 3 wt % or less

Other oxides: less than 2 wt %

As the Ca silicate fibers, the following composition can be exemplified.

$SiO_2$: 66 to 82 wt % (for example, 68 to 80 wt %, 70 to 80 wt %, or 71 to 80 wt %, or 71 to 76 wt %)

CaO: 10 to 34 wt % (for example, 18 to 32 wt %, 20 to 30 wt %, 20 to 27 wt % or 21 to 26 wt %)

MgO: 3 wt % or less (for example, 1 wt % or less)

$Al_2O_3$: 5 wt % or less (for example, 3.5 wt % or less, 3.4 wt % or less or 3 wt % or less, or 1 wt % or more, 1.1 wt % or more or 2 wt % or more)

Other oxides: less than 2 wt %

If the amount of $SiO_2$ is within the above-mentioned amount range, the fibers have excellent heat resistance. If the amounts of CaO and MgO are within the above-mentioned amount range, the fibers have excellent bio-solubility before and after the heating. If the amount of $Al_2O_3$ is within the above-mentioned range, the fibers have excellent heat resistance.

Further, the total of $SiO_2$, CaO, MgO and $Al_2O_3$ may be larger than 98 wt % or larger than 99 wt %.

The above-mentioned bio-soluble inorganic fibers may contain, as other components, one or more selected from alkali metal oxides ($K_2O$, $Na_2O$, $Li_2O$ or the like), oxides of a metal selected from Sc, La, Ce, Pr, Nd, Sm, Eu, Gd, Tb, Dy, Ho, Er, Tm, Yb, Lu and Y or a mixture thereof, $Fe_2O_3$, $ZrO_2$, $TiO_2$, $P_2O_5$, $B_2O_3$, MnO, ZnO, SrO, BaO, $Cr_2O_3$ and the like. They need not be contained. The content of each of other oxides may be 1.0 wt % or less, 0.2 wt % or less or 0.1 wt % or less. As for the alkali metal oxide, the content of each oxide may be 1.0 wt % or less, 0.2 wt % or less, or 0.1 wt % or less, and the total of alkali metal oxides may be 1.0 wt % or less, 0.2 wt % or less, or 0.1 wt % or less.

The bio-soluble fibers may further contain other components in addition to $SiO_2$ and an alkaline earth metal oxide (for example, at least one of MgO and CaO). For example, they may further contain one or two or more selected from alumina ($Al_2O_3$), titania ($TiO_2$), zirconia ($ZrO_2$), iron oxide ($Fe_2O_3$), manganese oxide (MnO) and potassium oxide ($K_2O$).

The bio-soluble inorganic fibers are inorganic fibers having a physiological saline dissolution ratio at 40° C. of 1% or more, for example.

The physiological saline dissolution ratio is measured by the following method, for example. Specifically, first, 1 g of the sample obtained by pulverizing and adjusting inorganic fibers to 200 meshes or less and 150 mL of physiological saline are put in a conical flask (volume: 300 mL). This flask is placed in an incubator of 40° C. Next, to the conical flask, a horizontal vibration (120 rpm) is continuously applied for 50 hours. Thereafter, the concentration (mg/L) of each element contained in a filtrate obtained by filtration is measured by an ICP emission spectrometry apparatus. Based on the measured concentration of each element and the content (mass %) of each element in inorganic fibers before dissolution, the physiological saline dissolution ratio (%) is calculated. That is, for example, if the measurement elements are silicon (Si), magnesium (Mg), calcium (Ca) and aluminum (Al), the physiological saline dissolution ratio C (%) is calculated in accordance with the following formula: C (%)=[Amount of filtrate (L)×(a1+a2+a3+a4)×100]/[Mass (mg) of inorganic fibers before dissolution×(b1+b2+b3+b4)/100]. In this formula, a1, a2, a3 and a4 are respectively the measured concentration (mg/L) of silicon, magnesium, calcium and aluminum and b1, b2, b3 and b4 are respectively the content (mass %) of silicon, magnesium, calcium and aluminum in the inorganic fibers before dissolution.

It is preferred that bio-soluble inorganic fibers be heated at a certain temperature within a range of 300 to 1300° C. in advance in order to prevent curvature of the resulting board.

The heat treatment temperature of the Mg silicate fibers is 600 to 1300° C., for example, preferably 800 to 1300° C., and more preferably 850 to 1000° C.

The heat treatment temperature of the Ca silicate fibers is 820 to 1300° C., for example, preferably 830 to 1300° C., more preferably 840 to 1000° C., with 850 to 1000° C. being most preferable.

The heat treatment temperature may be a temperature that is equal to or higher than the crystallization temperature of un-treated fibers. By subjecting un-treated fibers to a heat treatment at a temperature that is equal to or higher than the crystallization temperature, heat-treated fibers that are partially crystallized are obtained.

The crystallization temperature varies depending on the chemical composition of un-treated fibers, therefore it cannot be decided unconditionally. The crystallization temperature is 600 to 1300° C., 600 to 1100° C. or 800 to 1000° C., for example.

If the heat-treated fibers are the above-mentioned Ca silicate fibers, the partially crystallized heat-treated fibers contain crystals of wollastonite, for example. The heat-treated fibers may further contain other crystals. For example, they contain one or two or more crystals selected from wollastonite, crystobalite and tridymite.

If the heat-treated fibers are the above-mentioned Mg silicate fibers, the partially crystallized heat-treated fibers contain crystals of enstatite, for example. The heat-treated fibers may further contain other crystals. For example, they contain one or two or more crystals selected from enstatite, diopside, crystobalite and tridymite.

The heat-treatment time is not particularly restricted as long as the advantageous effects by the above-mentioned heat treatment can be obtained. The heat-treatment time is 1 minute to 48 hours, for example, preferably 3 minutes to 24 hours. If the heat-treatment temperature is equal to or higher than the crystallization temperature of un-treated fibers, the heat-treatment time is 3 minutes to 8 hours, for example, preferably 5 minutes to 3 hours.

The support member may contain, in addition to the above-mentioned bio-soluble inorganic fibers, reinforcing fibers such as silica-alumina fibers, silica fibers, alumina fibers, zirconia fibers, glass fibers, rock wool or the like.

Further, the support member may contain, in addition to inorganic fibers, an organic binder, an inorganic binder or the like. For these, it is possible to use a normal binder as long as it does not inhibit the advantageous effects of the invention. As the organic binder, starch, an acrylic resin, polyacrylamide, pulp, acrylic emulsion or the like can be exemplified. As the inorganic binder, colloidal silica such as anionic colloidal silica and cationic colloidal silica, fumed silica, zirconia sol, titania sol, alumina sol, bentonite, kaolin or the like can be exemplified. The amount of these binders is 1 to 50 wt %, more preferably 3 to 30 wt % and further preferably 5 to 20 wt % relative to the support member.

The support member may further contain inorganic powder. The inorganic powder is ceramic powder such as zircon, calcium carbonate, cordierite, wollastonite, silica, alumina, titania, zirconia, silicon nitride and silicon carbonate and carbon powder such as carbon black, for example. The amount of the inorganic powder is normally 0 wt % to 80 wt %, more preferably 0 wt % to 50 wt %, and further preferably 0 wt % to 30 wt % relative to the support member.

The heat-generating member used in the heating device is not particularly restricted. For example, an iron-chromium-aluminum-based metal heat-generating member or a nickel-chromium-based metal heat-generating member can be given. As such a metal heat-generating member, a coil-like or wavy metal heat-generating member can be mentioned.

As an example of the method for coating the support member (bio-soluble inorganic fibers) with a silica-containing treatment agent, a hardening treatment using silica will be explained. A heat-insulating member (shaped product, board) is produced from bio-soluble inorganic fibers. Normally, a heat-insulating member is produced by subjecting a slurry that contains a raw material such as inorganic fibers and a binder to dehydration forming. The support member may be formed (for example, in the example shown in FIG. 1A, a based part and a side wall are laminated. In the example shown in FIG. 1B, processing (cutting) is conducted to obtain a desired shape, or the like) before the heat-insulating member is subjected to a hardening treatment, or a hardening treatment may be conducted after the support member is formed.

The heating device shown in FIG. 1C can be produced by setting the heat-generating member in a predetermined mold at the time of dehydration forming, followed by a hardening treatment after the forming. In order to adjust the position where a heat-generating member is embedded, dehydration shaping may be conducted plural times. If coating of fibers with silica may become insufficient when a hardening treatment is conducted after the embedding of a heat-generating member, a hardening treatment may be conducted during a dehydration shaping process.

In the hardening treatment, colloidal silica may be used as a hardening agent. As examples of colloidal silica, alkaline colloidal silica (pH 8 to 10), acidic colloidal silica (pH 2 to 6) and cationic colloidal silica, or the like can be given.

A hardening treatment is conducted by immersing a member or the support member (hereinafter simply referred to as "member") in a hardening treatment liquid, or by applying a hardening treatment liquid (brush coating, roll coating, or the like) or blowing (showering, spraying, or the like). Drying is conducted after the hardening treatment. At the time of drying, since a solvent is evaporated through the surface, the solvent moves to the surface, and with that move of the solvent, the colloidal silica also moves to the surface. Since colloidal silica remains even if the solvent is evaporated, colloidal silica is distributed unevenly in the vicinity of the surface. As a result, the surface is hardened. As the solvent, water, a monovalent alcohol such as ethanol and propanol, a divalent alcohol such as ethylene glycol, or the like can be used.

The amount of colloidal silica contained in the member as a result of a hardening treatment is an amount that allows the density of the member to be increased by 10% to 150%, for example, preferably 10% to 100% and more preferably 10% to 50%. Normally, the member is immersed in colloidal silica having a solid content of 10 to 30% for 1 second to several minutes (not limited thereto). The treatment may be conducted once or twice or more. The water content of the member that has been subjected to a hardening treatment is normally about 5 wt % or less. The water content is confirmed based on the weights before and after the drying.

By conducting the above-mentioned hardening treatment, the member (bio-soluble inorganic fibers) is coated with silica. At the same time, the hardness of the member is improved, whereby strength is increased and handling properties are improved (i.e. no hand marks are generated when gripping, no gouges are formed when processing, no sharp edges are formed when cutting, and problems such as powder dropping are not caused).

If the member is treated by using alkaline colloidal silica as a hardening agent, an alkaline earth metal ion (in particular, Ca ions, Mg ions) is eluted in a hardening treatment liquid. These ions are reacted with a hardening agent on the surface of a member, and when heated at 800° C. or higher, cracks may occur.

In order to suppress occurrence of cracks, the member is treated with a chelating agent that does not contain metal ions and a hardening agent. It is assumed that, since a chelating agent captures an alkaline earth metal that elutes, occurrence of a reaction between an alkaline earth metal and a hardening agent is suppressed to prevent occurrence of cracks. Since a chelating agent has two or more electron-donating groups, a metal chelating compound can be generated. As the electron-donating group, a carboxyl group, a hydroxyl group or the like can be given. A chelating agent used in the invention does not contain an alkaline earth metal or an alkali metal. As examples of a chelating agent, a chelating agent having a composition of an EDTA (ethylenediaminetetraacetic acid).H.3 (NH$_4$), a chelating agent having a composition of an EDTA.2H.2 (NH$_4$), or the like can be given.

As the hardening agent to be used in combination with a chelating agent, colloidal silica can be used. Alkaline colloidal silica, acidic colloidal silica, cationic colloidal silica or the like can be used. The concentration of a chelating agent can be set appropriately, when alkaline colloidal silica is used as a hardening agent, the concentration is preferably 0.5 wt % or more relative to a hardening treatment liquid having a solid content of 10 wt %.

In order to prevent occurrence of cracks, the member may be treated in a hardening treatment liquid having a pH of 6 or less (preferably, a pH of 1 to 6, more preferably a pH of 2 to 5, and particularly preferably a pH of 3 to 5). It is assumed that, by allowing the member to be acidic, elution of an alkaline earth metal can be suppressed, and as a result, occurrence of a reaction between an alkaline earth metal and a hardening agent can be suppressed, whereby occurrence of cracks is prevented.

Specifically, the member is treated with an acid and a hardening agent. The acid may be either a weak acid or a strong acid. As examples of a weak acid, citric acid, malic acid, tartaric acid, salicyclic acid, glycolic acid, lactic acid, mandelic acid, benzylic acid, coumaric acid, acetic acid or the like can be given. As examples of a strong acid, sulfuric acid, hydrochloric acid, nitric acid or the like can be given. A weak acid is preferable since gases are not generated.

An acidic (having a pH of 1 to 6 or 2 to 5, for example) colloidal silica may be used. As the acidic colloidal silica, a commercially-available product such as Silicadol 20A (manufactured by Nippon Chemical Industrial Co., Ltd., solid matter content: 20%), Cataloid SN (manufactured by JGC C&C, solid matter content: 20%) or the like can be used.

As examples of a treatment agent that has both chelating effects and the property of allowing the pH to be acidic, a hydroxylic acid such as citric acid, malic acid, tartaric acid and salicylic acid or the like can be given.

If a cationic colloidal silica (having a pH of 4 to 6, for example) is used as a hardening agent, elution of an alkaline earth metal can be suppressed. In this case, it is assumed that, a protective film is formed on the surface by a cationic colloidal silica, whereby a reaction of an alkaline earth metal and a hardening agent is suppressed. The cationic colloidal silica means colloidal silica that has positive charges on the surface thereof. For example, one obtained by incorporating a compound of a polyvalent metal ion such as an aluminum ion or an organic cationic compound on the surface or the inside of colloidal silica to allow the surface of silica particles to be cationically charged can be given. As the cationic colloidal silica, a commercial product such as Snowtex AK (manufactured by Nissan Chemical Industries, solid matter content: 18%) or the like can be used.

Since the hardened member is obtained by the treatment mentioned above, a hardening agent is infiltrated through the surface thereof.

By attaching the heat-generating member to the support member treated by the above-mentioned process, the heating device is obtained.

The method for producing the device of the invention is not restricted to the method mentioned above, and can be produced by a known method.

EXAMPLES

Example 1

Production of a Board (Heat-Insulating Member)

A board having a length of 300 mm, a width of 300 mm and a thickness of 50 mm (density: 250 kg/m$^3$) (hereinafter referred to as the organic board) was produced from 90 wt % of bio-soluble fibers A (SiO$_2$ content: 73 mass %, CaO content: 25 mass %, MgO content: 0.3 mass %, Al$_2$O$_3$ content: 2 mass %) (dissolution ratio in physiological saline: 10.4%), starch and polyacrylamide (organic binder) and colloidal silica (inorganic binder).

Further, a board having a length of 300 mm, a width of 300 mm and a thickness of 50 mm (density: 250 kg/m$^3$) (hereinafter referred to as the inorganic board) was produced from 85 wt % of bio-soluble fibers A, colloidal silica, alumina sol and bentonite (inorganic binder), inorganic powder (silica, zircon, calcium carbonate, zirconia, cordierite, wollastonite, or the like) and acrylamide (organic binder).

Production Example 2

Production of a Board (Heat-Insulating Member)

An organic board and an inorganic board were produced in the same manner as in Production Example 1, except that bio-soluble fibers B (SiO$_2$ content: 76 mass %, CaO content: 4 mass %, MgO content: 18 mass % and Al$_2$O$_3$ content: 2 mass %) (dissolution ratio in physiological saline: 23.1%) were used instead of bio-soluble fibers A.

Production Example 3

Production of a Board (Heat-Insulating Member)

An organic board and an inorganic board were produced in the same manner as in Production Example 1, except that inorganic fibers C (SiO$_2$ content: 47 mass %, and Al$_2$O$_3$ content: 52 mass %) (dissolution ratio in physiological saline: 0.1%) were used instead of bio-soluble fibers A.

Treatment Example 1

Hardening Treatment with Silica

The organic boards and the inorganic boards obtained in Production Examples 1 to 3 (density: 250 kg/m$^3$) were treated (immersed for 1 to 10 seconds) with a hardening liquid formed of an alkaline colloidal silica (pH about 9, solvent: water), and the surfaces thereof were hardened and dried. The density was 300 kg/m$^3$. After the hardening, the strength was increased. The hardness of the hardened organic and inorganic boards was measured by means of a durometer (Durometer Type C, manufactured by Kobunshi Keiki Co., Ltd.). The results are shown in Table 1.

The organic board and the inorganic board obtained in Production Example 1 were evaluated without conducting a hardening treatment. The hardness was measured by the same method as mentioned above. The results are shown in Table 1.

TABLE 1

| | Fibers (A) | | | |
| --- | --- | --- | --- | --- |
| | Organic board | | Inorganic board | |
| | Before hardening | After hardening | Before hardening | After hardening |
| Hardness (°) | 50 | 85 | 40 | 75 |

Treatment Example 2

Hardening Treatment with Silica

Hardening was conducted and the hardness was measured in the same manner as in Treatment Example 1, except that the organic board and the inorganic board obtained in Production Example 2 were used. The results are shown in Table 2.

TABLE 2

| | Fibers (B) | | | |
|---|---|---|---|---|
| | Organic board | | Inorganic board | |
| | Before hardening | After hardening | Before hardening | After hardening |
| Hardness (°) | 50 | 70 | 45 | 65 |

Treatment Example 3

Hardening Treatment with Silica

Hardening was conducted in the same manner as in Treatment example 1, except that the organic board and the inorganic board obtained in Production Example 3 were used. After treating, the strength was improved.

Treatment Example 4

Hardening Treatment with Silica and Chelating Agent

Hardening Treatment

The organic board and the inorganic board obtained in Production Example 1 were treated with a hardening treatment liquid (pH about 9, solvent: water) composed of diammonium salts of EDTA and alkaline colloidal silica, and the surface was hardened and dried. The chelating agent was used at a concentration of 1 wt % relative to 10 wt % of solid matters.

Heating Test

The hardened organic and inorganic boards were heated at 800° C., 900° C., 1000° C. and 1100° C. for 24 hours, and the appearance (occurrence of cracks) was visually observed. For the purpose of comparison, the hardened organic board and the hardened inorganic board obtained in Production Example 1 were similarly heated and observed. The board having no cracks was evaluated as ⊚, the board having only small cracks was evaluated as ○, the board having large cracks was evaluated as ▲, and the broken board was evaluated as x.

TABLE 3

| | | 800° C. | 900° C. | 1000° C. | 1100° C. |
|---|---|---|---|---|---|
| Alkaline colloidal silica | Organic board | ⊚ | ○ | ▲ | X |
| Alkaline colloidal silica | Inorganic board | ⊚ | ⊚ | ⊚ | ▲ |
| Alkaline colloidal silica + Chelating agent | Organic board | ⊚ | ⊚ | ⊚ | ⊚ |
| Alkaline colloidal silica + Chelating agent | Inorganic board | ⊚ | ⊚ | ⊚ | ⊚ |

Treatment Example 5

Hardening Treatment with Silica and an Acid

Hardening Treatment

The organic board obtained in Production Example 1 was treated with a hardening treatment liquid formed of an acid and alkaline colloidal silica, and the surface was hardened and dried. As the acid, citric acid, malic acid, tartaric acid and salicylic acid were used at a concentration of about 1 wt % relative to a hardening treating liquid having a solid content of 10 wt %, thereby to allow the pH of the treatment liquid to be 3 to 4.

Heating Test

A heating test was conducted in the same manner as in Treatment Example 4. The results are shown in Table 4.

TABLE 4

| Organic board (Fibers A) | | | | |
|---|---|---|---|---|
| Hardening treatment liquid | 800° C. | 900° C. | 1000° C. | 1100° C. |
| Alkaline colloidal silica + Citric acid | ⊚ | ⊚ | ⊚ | ⊚ |
| Alkaline colloidal silica + Malic acid | ⊚ | ⊚ | ⊚ | ⊚ |
| Alkaline colloidal silica + Tartaric acid | ⊚ | ⊚ | ⊚ | ⊚ |
| Alkaline colloidal silica + Salicylic acid | ⊚ | ⊚ | ⊚ | ⊚ |

Treatment Example 6

Hardening Treatment with Acidic Colloidal Silica and Cationic Colloidal Silica

Hardening Treatment

The inorganic board obtained in Production Example 2 was treated with acidic colloidal silica (Silicadol 20A, manufactured by Nippon Chemical Industrial Co., Ltd., pH: 2 to 4) or cationic colloidal silica (Snowtex AK, manufactured by Nissan Chemical Industries, Ltd.) (hardening agent), and the surface was hardened and dried.

Heating Test

A hardening test was conducted in the same manner as in Treatment Example 4. The results are shown in Table 5.

TABLE 5

| Inorganic board (Fibers B) | | | | |
|---|---|---|---|---|
| Hardening treatment liquid | 800° C. | 900° C. | 1000° C. | 1100° C. |
| Acidic colloidal silica | ⊚ | ⊚ | ⊚ | ⊚ |
| Cationic colloidal silica | ⊚ | ⊚ | ⊚ | ⊚ |

Example 1

Stability Test of Hardened Inorganic Board at High Temperatures

A heater wire was put on the inorganic board (insulating member) that was obtained in Treatment Example 1 and had been subjected to a hardening treatment. The inorganic board with the heater wire being put thereon was subjected to a heat treatment in an electronic furnace at 1000° C. to 1300° C. for 8 hours. The appearance of the board and the heater wire after heating was observed to confirm the occurrence of the reaction. The board suffering no reaction between the heater wire and the board was evaluated as ○, the board in which a small amount of the fibers was adhered to the heater wire was evaluated as Δ, and the board in which a large amount of board fibers was adhered to the heater wire was evaluated as x. The results are shown in Table 6.

Example 2 and Comparative Examples 1 to 4

The stability of the heater wire and the board at high temperatures was tested in the same manner as in Example 1, except that the inorganic board shown in Table 6 was used instead of the inorganic board that had been subjected to a hardening treatment in Treatment Example 1. The results are shown in Table 6.

TABLE 6

|  | Board | Fibers | Hardening treatment | 1000° C. | 1100° C. | 1200° C. | 1300° C. |
|---|---|---|---|---|---|---|---|
| Ex. 1 | Production Ex. 1 | A | Conducted (Treatment Ex. 1) | ○ | ○ | ○ | ○ |
| Ex. 2 | Production Ex. 2 | B | Conducted (Treatment Ex. 2) | ○ | ○ | ○ | ○ |
| Comp. Ex. 1 | Production Ex. 1 | A | Not conducted | ○ | Δ | X | X |
| Comp. Ex. 2 | Production Ex. 2 | B | Not conducted | ○ | Δ | X | X |
| Comp. Ex. 3 | Production Ex. 3 | C | Not conducted | ○ | ○ | ○ | ○ |
| Comp. Ex. 4 | Production Ex. 3 | C | Conducted (Treatment Ex. 3) | ○ | ○ | ○ | ○ |

As for the heat-insulating member that contained bio-soluble inorganic fibers, if it was not subjected to a hardening treatment, a large amount of fibers was adhered to the heater when heated at 1200° C. At 1300° C., the fibers are molten, and green marks were put to the heat insulating member, showing that the heater components were transferred.

As for the heat-insulating member that contained bio-soluble inorganic fibers, if it was subjected to a hardening treatment, a significantly small amount of fibers was adhered at 1300° C. However, a reaction between the heat-insulating member (fibers) and the heater wire was suppressed.

INDUSTRIAL APPLICABILITY

The heating device of the invention can be used in various applications such as a combustion furnace of electronic parts, an electronic furnace for dissolving or firing glass, a Muffle furnace, a ceramic art furnace and various industrial furnaces.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in this specification and the Japanese application specification claiming priority under the Paris Convention are incorporated herein by reference in its entirety.

The invention claimed is:

1. A heating device comprising:
a heater; and
a support member that supports the heater and comprises bio-soluble inorganic fibers,
wherein the bio-soluble inorganic fibers are Mg silicate fibers having the following composition or Ca silicate fibers having the following composition:
[Mg silicate fibers]
$SiO_2$: 66 to 82 wt %
CaO: 1 to 9 wt %
MgO: 10 to 30 wt %
$Al_2O_3$: 3 wt % or less
Other oxides: less than 2 wt %
[Ca silicate fibers]
$SiO_2$: 66 to 82 wt %
CaO: 10 to 34 wt %
MgO: 3 wt % or less
$Al_2O_3$: 5 wt % or less
Other oxides: less than 2 wt %
wherein the heating device comprises any coating of the following configurations (1) to (3); and due to the coating, the bio-soluble inorganic fibers do not contact directly the heater or the contact of the bio-soluble inorganic fibers with the heater is reduced compared with a heater without the coating:
(1) at least surfaces of the support member that contact the heater are coated;
(2) bio-soluble inorganic fibers that are present on at least surfaces of the support member that contact the heater are coated; and
(3) the heater is coated.

2. The heating device according to claim 1, wherein in the configuration (1), a silica-containing treatment agent is infiltrated into the support member through at least the surfaces that contact the heater to cause the surfaces to be hardened.

3. The heating device according to claim 1, wherein in the configuration (2), the bio-soluble inorganic fibers are coated with a silica-containing treatment agent.

4. The heating device according to claim 1, wherein in the configuration (3), the heater is coated with a silica-containing treatment agent.

5. The heating device according to claim 2, wherein the silica is in one form or in a combination of two or more forms selected from colloid, powder and a metal alkoxide.

6. The heating device according to claim 2, wherein the silica-containing treatment agent comprises a chelating agent that does not contain metal ions.

7. The heating device according to claim 2, wherein the silica-containing treatment agent contains an acid.

8. The heating device according to claim 2, wherein the silica is an acidic colloidal silica or a cationic colloidal silica.

9. The heating device according to claim 1, wherein the reaction between the bio-soluble inorganic fibers and the heater is suppressed when the temperature of the heater is 1100° C.

10. The heating device according to claim 1, wherein the bio-soluble inorganic fibers are heat-treated.

\* \* \* \* \*